(12) United States Patent
Gribb (10) Patent No.: US 10,776,457 B1
(45) Date of Patent: Sep. 15, 2020

(54) SYSTEM AND METHOD FOR PREVENTING EXECUTION OF UNAUTHORIZED CODE

(71) Applicant: Epic Games, Inc., Cary, NC (US)

(72) Inventor: Gil Wheaton Gribb, Madison, WI (US)

(73) Assignee: EPIC GAMES, INC., Cary, NC (US)

(*) Notice: Subject to any disclaimer, the term of this patent is extended or adjusted under 35 U.S.C. 154(b) by 153 days.

(21) Appl. No.: 14/337,552

(22) Filed: Jul. 22, 2014

(51) Int. Cl.
*G06F 21/10* (2013.01)
*H04L 9/32* (2006.01)
*H04L 9/08* (2006.01)
*G06F 21/62* (2013.01)

(52) U.S. Cl.
CPC .......... *G06F 21/10* (2013.01); *G06F 21/6272* (2013.01); *H04L 9/0861* (2013.01); *H04L 9/3247* (2013.01)

(58) Field of Classification Search
CPC ....... H04N 2201/3233; H04N 21/8358; H04N 1/32144; H04L 9/3281; G11B 20/00086; G06F 21/10
USPC ......................................................... 713/176
See application file for complete search history.

(56) References Cited

U.S. PATENT DOCUMENTS

| | | | | |
|---|---|---|---|---|
| 5,974,529 A | * | 10/1999 | Zumkehr | G06F 9/3005 |
| | | | | 712/239 |
| 6,722,986 B1 | * | 4/2004 | Lyons | G06F 21/51 |
| | | | | 463/29 |
| 7,725,942 B2 | * | 5/2010 | Giraud | G07F 7/1008 |
| | | | | 718/100 |
| 2002/0150243 A1 | * | 10/2002 | Craft | H04L 63/0823 |
| | | | | 380/201 |
| 2004/0049679 A1 | * | 3/2004 | Meggle | G06Q 20/341 |
| | | | | 713/172 |
| 2004/0181672 A1 | * | 9/2004 | Ferri | G06F 21/51 |
| | | | | 713/176 |
| 2006/0036851 A1 | * | 2/2006 | DeTreville | G06F 9/4406 |
| | | | | 713/159 |
| 2006/0129848 A1 | * | 6/2006 | Paksoy | G06F 21/78 |
| | | | | 713/193 |
| 2010/0088520 A1 | * | 4/2010 | Charles | H04L 67/108 |
| | | | | 713/178 |
| 2012/0011345 A1 | * | 1/2012 | Robertson | G06F 21/72 |
| | | | | 712/42 |
| 2012/0072734 A1 | * | 3/2012 | Wishman | G06F 21/60 |
| | | | | 713/189 |

(Continued)

*Primary Examiner* — Benjamin E Lanier
(74) *Attorney, Agent, or Firm* — Hunton Andrews Kurth LLP (57) ABSTRACT

Systems and method provide for generation of a unique key pair having a public and private key for an individual device. The public key may be embedded (e.g., burned or etched) into a central processing unit (CPU) during the manufacturing process. The burning or etching process may make the public key unmodifiable. The matching private key may then be stored in a secure database. Software code may be available through download over a computer based network (e.g., the Internet). A request may be made for the software code. Prior to delivery, the software code may be digitally signed with the private key corresponding to the individual device. Logic programmed into the CPU may prevent the execution of code that is not signed with the private key that corresponds to the public key.

12 Claims, 4 Drawing Sheets

(56) References Cited

U.S. PATENT DOCUMENTS

| | | | | |
|---|---|---|---|---|
| 2012/0260107 A1* | 10/2012 | Mangard | ................. | G06F 21/72 |
| | | | | 713/190 |
| 2013/0185548 A1* | 7/2013 | Djabarov | .............. | H04L 41/082 |
| | | | | 713/2 |
| 2014/0223174 A1* | 8/2014 | Krishnamurthy | ... | H04L 63/0823 |
| | | | | 713/158 |
| 2014/0380058 A1* | 12/2014 | Agarwal | ................. | H04L 9/083 |
| | | | | 713/176 |

* cited by examiner

SYSTEM AND METHOD FOR PREVENTING EXECUTION OF UNAUTHORIZED CODE

FIELD OF PREFERRED EMBODIMENTS

Exemplary embodiments relate generally to preventing software piracy and enhancing security on closed platforms that rely upon digital distribution of software. Specifically, exemplary embodiments provide executable binary code, that is digitally signed on a per-device basis, prior to download, that cannot be executed on another device.

BACKGROUND

Software piracy is a rampant problem in the computer industry. There are different methods used in attempts to prevent such software piracy. For example, many closed platforms currently use signed code to prevent unauthorized code from running; however, this code is signed the same for each device. The closed platform will not run unsigned code, but since the executable binary code is signed once, for all devices, if the operating system is breached, the signature check can be disabled and unauthorized code can be executed thereon. Thus, the security feature is capable of being defeated and the software being run on unauthorized devices.

These and other deficiencies exist.

SUMMARY OF THE PREFERRED EMBODIMENTS

An exemplary embodiment includes a computer implemented method with the following steps: generating a unique key pair including a public key and a private key for an individual device; embedding the public key into a central processing unit of the individual device such the public key is not alterable; programming logic into the central processing unit preventing execution of software code that is not digitally signed with the private key; and storing the private key in a data store.

Another exemplary embodiment includes a computer implemented method with the following steps: receiving a request for software code over a computer network; identifying an individual device associated with the request; correlating the device with a central processing unit having a public key; identifying a private key corresponding to the public key associated with the individual device; retrieving the private key; digitally signing the software code with the private key; and providing the digitally signed software code for download.

In other exemplary embodiments, the preceding methods may be performed using a system with a processor and a memory comprising computer-readable instructions which when executed by the processor cause the processor to perform the method steps.

An exemplary system, according to an exemplary embodiment, includes a processor having a public key permanently embedded thereon; and a cache having computer-readable instructions including logic that serves as a functional block between a main memory and the cache that that ensures each instruction is digitally signed with the private key prior to entering the instruction cache for execution by the central processing unit.

These and other embodiments and advantages of the invention will become apparent from the following detailed description, taken in conjunction with the accompanying drawings, illustrating by way of example the principles of the various exemplary embodiments.

DETAILED DESCRIPTION OF THE PREFERRED EMBODIMENTS

It will be readily understood by those persons skilled in the art that the embodiments of the inventions described herein are capable of broad utility and application.

The following descriptions are provided of different configurations and features according to exemplary embodiments. While certain nomenclature and types of applications/hardware are described, other names and application/hardware usage is possible and the nomenclature provided is done so by way of non-limiting examples only. Further while particular embodiments are described, it should be appreciated that the features and functions of each embodiment may be combined in any combination as is within the capability of one of ordinary skill in the art. The attached Figures provide additional details regarding the present invention. It should also be appreciated that these exemplary embodiments are provided as non-limiting examples only.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that embodiments described may be integrated into and run on a computer, which may include a programmed processing machine which has one or more processors. Such a processing machine may execute instructions stored in a memory to process the data and execute the methods described herein.

For the methods depicted herein, each block shown in a Figure represents one or more processes, methods, and/or subroutines carried out in the exemplary methods. Each block may have an associated processing machine or the blocks depicted may be carried out through one processor machine. Furthermore, while the steps may be shown in a particular order, it should be appreciated that the steps may be conducted in a different order.

As noted above, the processing machine executes the instructions that are stored in the memory or memories or persistent or non-transitory data storage devices to process data. This processing of data may be in response to commands by a user or users of the processing machine, in response to previous processing, in response to a request by another processing machine and/or any other input, for example. As described herein, a module performing functionality may have a processor.

The logic herein described may be implemented by hardware, software, and/or a combination of the two. In embodiments where the logic is implemented using software, upgrades and other changes may be performed without hardware changes. The software may be embodied in a non-transitory computer readable medium.

The following description is intended to convey a thorough understanding of the embodiments described by providing a number of specific embodiments and details involving systems and methods for preventing unauthorized code from being executed (e.g., running) on a device. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

According to exemplary embodiments, a key pair of a public and private key may be created or generated for an individual device. The key pair may be unique. The public key may be embedded (e.g., burned or etched) into a central processing unit (CPU) of the individual device during the manufacturing process. The burning or etching process may make the public key unmodifiable. The matching private key may then be stored in a secure database. Logic programmed into the CPU may prevent the execution of code that is not signed with the private key. Code may refer to software, applications, or other executable instructions which may be executed by the CPU. For example, the code may be executable binary code. The code may be available through download over a computer based network (e.g., the Internet).

A user may submit a download request to a server. The user may be a registered user of the system of which the server is a part. Upon the download request from the user, the server may check to see which CPU (e.g., which individual device) the user is using and its allocated public key. This check may be based on the user's registration (e.g., the user may purchase the device and register it; the registration may associate the CPU (based on the device) and its public key with the particular user). The server may digitally sign the code with the private key that corresponds to the public key associated with the CPU of the individual device. The code may be digitally signed at each instruction line. In various embodiments, the instruction lines may be digitally signed in various combinations. The code may be digitally signed on the majority of instruction lines. For example, a subset and/or group of instruction lines may be digitally signed. In some embodiments, the portion of the code that is digitally signed may be a portion containing an algorithm or other sensitive portion of the code (e.g., a portion containing proprietary code, etc.). The user may download the code.

Upon execution of the code on the device, the CPU will verify the signature and that the private key matches the public key. This check may be performed every time the code is executed. In various embodiments, the check may be performed for every instruction executed by the code or some variant thereof. For example, every $5^{th}$ instruction may be verified. If the signature does not match, the CPU may cease execution of the code. In some embodiments, the match may be a substantial match or a partial match. In other embodiments, once a match is achieved on the first check, substantial and/or partial matches may be possible on later verifications in the same execution session. A tiered method of verifying the key matching may be used. For example, certain portions of the code may not require an exact match of the key pair while other portions may require an exact match of the key pair to continue execution of the code.

It should be appreciated that while the term device or individual device is used, this is meant to be non-limiting and inclusive of different types of devices which have CPU's such as a server, a personal computer (PC), a workstation, a mobile device, a phone, a handheld PC, a personal digital assistant (PDA), a thin client, a fat client, a mobile gaming device, a game server, and/or a gaming console.

It should be appreciated that while the term CPU is used, this is meant to be non-limiting and inclusive of different types of CPU's such as an accelerated, auxiliary, or advanced processing unit (APU) (including graphics processing units (GPU) and field programmable gate arrays (FPGA)), integrated circuits, and microprocessors.

Figure 1:
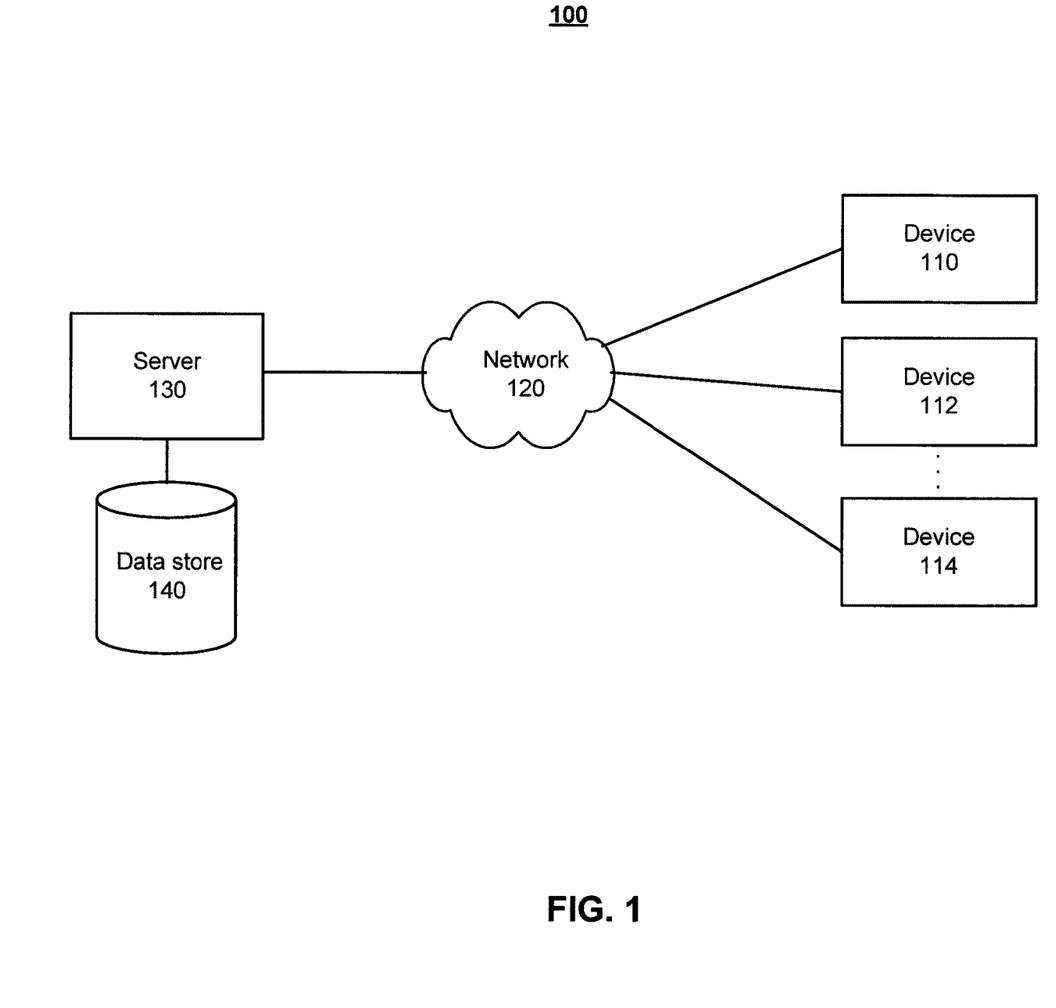
FIG. 1 is a diagram of a system in accordance with an exemplary embodiment.

FIG. 1 depicts a system according to an exemplary embodiment. System 100 may provide various functionality and features associated with the program. More specifically, system 100 may include devices 110, 112, 114, a network 120, a server 130, and a data store 140. In various embodiments, the term "client" may refer to the software product a person is using. In various embodiments, the term "server" may refer to the networked computer or groups of computers that process and provide a game event.

The devices 110, 112, and 114 may each include a network-enabled computer system and/or device. The devices 110, 112, and 114 may each contain one or more CPU's. Each CPU may have a public key embedded (e.g., burned or etched) into the CPU as described herein. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, a game server, a hand held gaming device, a gaming console, or other device. The network-enabled computer system may execute one or more software applications to, for example, receive data as input from an entity accessing the network-enabled computer system, process received data, transmit data over a network, and receive data over a network, such as the network 120. The one or more network-enabled computer systems may also include one or more software applications which perform the functions as described herein.

The server 130 may include a network-enabled computer system and/or devices. The network-enabled computer system may execute one or more software applications to, for example, receive data as input from an entity accessing the network-enabled computer system, process received data, transmit data over a network, and receive data over a network, such as the network 120. The one or more network-enabled computer systems may also include one or more software applications which perform the functions as described herein.

The game server 130 may include various modules to perform the functions described herein. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

The game server 130 may contain data storage for software (e.g., game executable code or other executable code), storing and tracking public/private key pairs, and/or user data, for example, as represented by data store 140. The game server 130 may receive requests for download of software as described herein. The requests may originate from one or more of the devices 110, 112, and 114 and may be communicated over the network 120. Data store 140 may utilize a redundant array of inexpensive disks ("RAID"), tape, disk, a storage area network ("SAN"), an internet small computer systems interface ("iSCSI") SAN, a Fibre Channel SAN, a common Internet File System ("CIPS"), network attached storage ("NAS"), a network file system ("NFS"), or other computer accessible storage. In one or more embodiments, data storage may be a database, such as an Oracle database, a Microsoft SQL Server database, a DB2 database, a MySQL database, a Sybase database, an object oriented database, a hierarchical database, a NoSQL type database, or other database. The data store 140 may also utilize flat file structures for storage of data. While the data store 140 is illustrated as a single component in the exemplary figure, the system may include a single consolidated data store or multiple data stores at the same location or distributed across multiple locations.

The network 120 may be one or more of a wireless network, a wired network or any combination of wireless network and wired network. For example, the network 120 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, the network 120 may include, without limitation, telephone lines, fiber optics, IEEE Ethernet 902.3, a wide area network ("WAN"), a local area network ("LAN"), or a global network such as the Internet. The network 120 may support an Internet network, a wireless communication network, a cellular network, or the like, or any combination thereof. The network 120 may further include one network, or any number of the exemplary types of networks mentioned above, operating as a stand-alone network or in cooperation with each other. The network 120 may utilize one or more protocols of one or more network elements to which they are communicatively coupled. The network 120 may translate to or from other protocols to one or more protocols of network devices. Although the network 120 is depicted as a single network, it should be appreciated that according to one or more embodiments, the network 120 may comprise a plurality of interconnected networks, such as, for example, the Internet, a service provider's network, a cable television network, corporate networks, and home networks.

Figure 2:
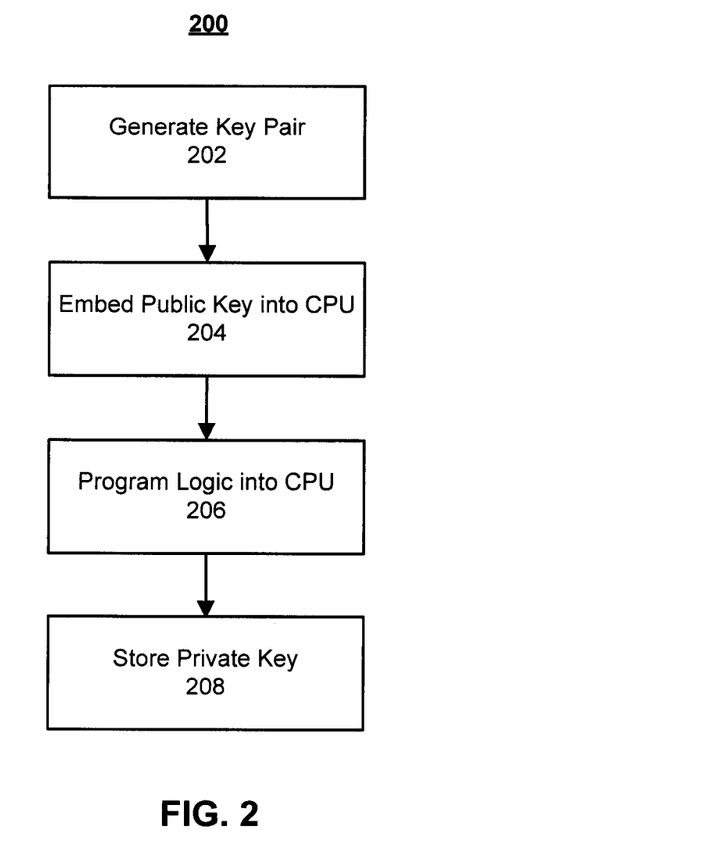
FIG. 2 is a flow chart of a method for creating a restricted use device and key pairs in accordance with an exemplary embodiment.

FIG. 2 depicts a flow chart of a method for creating a restricted use device according to exemplary embodiments. Exemplary method 200 is provided by way of example, as there are a variety of ways to carry out the methods disclosed herein. The method 200 as shown in FIG. 2 may be executed or otherwise performed by one or a combination of various systems, such as a computer implemented system.

At block 202, a key pair is generated. The key pair may have a public key and a private key that are matched. The key pair may be unique. The key pair may be created using a digital signature algorithm. According to one exemplary embodiment, a digital signature algorithm may be used such as: GenerateKeys( )→(public_key, private_key). Other digital signature algorithms may be used. The keys may be byte arrays of fixed length. In some embodiments, variable length byte arrays may be used.

At block 204, the public key is embedded into a CPU. The CPU may be part of an individual device as described herein. The public key may be burned, etched, hard coded, or otherwise indelibly placed into the CPU. This may be done in an irreversible manner to prevent alteration of the public key in the future. In some embodiments, the public key may be put into the CPU using an eFUSE or similar technology such that it may be later dynamically reprogrammed while the CPU is in operation. This would allow the public key to be changed at some point in the future if required. In changing the public key, a new private key would be required also (e.g., a new key pair would be required to be generated).

At block 206, logic is programmed into the CPU preventing execution of unsigned code. This logic may be programmed or imprinted using an instruction cache in the CPU. According to exemplary embodiments, a functional block may be added between the main memory and the instruction cache to verify the integrity of instructions before they are allowed to enter the instruction cache. Instruction caches typically operate on "cache lines" as an atomic unit. A cache line may be a fixed size array of bytes, such as 64 bytes (for example). According to exemplary embodiments, each cache line may be signed, so the cache line size must match the size of the signed line to be executed. In various embodiments, some multiple of cache lines may be signed. The signing may be done using a digital signature with the private key as described herein.

At block 208, the private key is stored. The private key may be stored in a data store (e.g., a database) or in another form of storage or memory. The private key may correspond to the public key (e.g., it is part of the generated key pair) that was burned into the CPU. The private key may be securely stored in the data store. For example, each private key may be encrypted or otherwise have restricted access thereto. The private key may be relationally associated with, mapped, or indexed to its corresponding public key in the data store to allow for later retrieval. Later, when the CPU is sold or conveyed to a user (e.g., in a device containing the CPU), the private key may be further associated with that device to allow for later association during a request for software from the device user.

Figure 3:
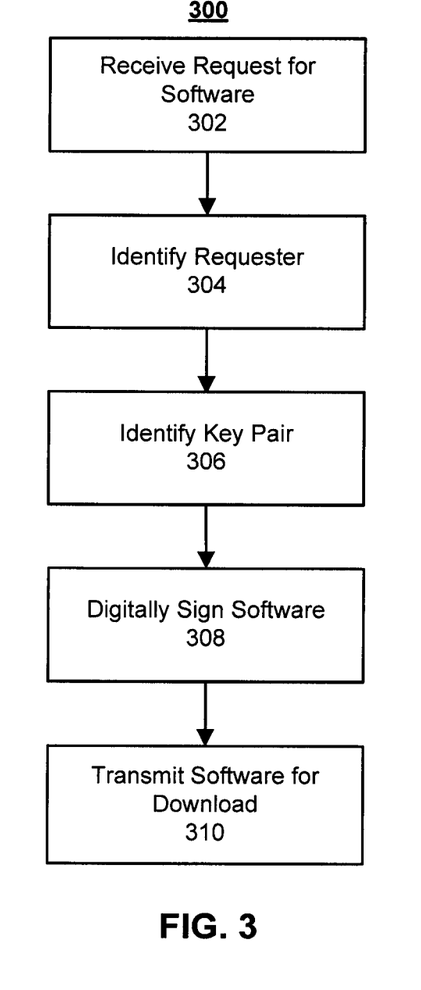
FIG. 3 is a flow chart of a method for creating signed code in response to a request in accordance with an exemplary embodiment.

FIG. 3 depicts a flow chart of a method for creating signed code according to exemplary embodiments. Exemplary method 300 is provided by way of example, as there are a variety of ways to carry out the methods disclosed herein. The method 300 as shown in FIG. 3 may be executed or otherwise performed by one or a combination of various systems, such as a computer implemented system.

At block 302, a request for software is received. The request may be received over a computer based network. For example, the request may be received over the Internet. The request may be received by a server, such as one described above in FIG. 1. The software may be executable binary code or any other type of computer executable code. For example, the software may be a program download, such as, a game or application.

At block 304, the requester is identified. The requester may be identified to ascertain the individual device associated with the request. As part of the request, the requester may be required to provide a username and/or other identifying information, such as information on the individual device for which the software is intended. The device information may be required to identify the CPU and its associated public key. To facilitate this process, the individual device may be registered by the requester in advance of the request. In some embodiments, the individual device may be associated with an account held by the requester. The request may originate through this account.

At block 306, the key pair may be identified. The private key associated with the public key may be identified based on the CPU identification associated with the individual device of the requester. The private key may be retrieved from the data store.

At block 308, the software may be digitally signed with the private key. The digital signed may be done using a signing routine. According to one exemplary embodiment, the signing routine may be: Sign(message, private_key)→signed_message. Other signing routines may be used. The signing routine may take the software (message) and produce a longer, signed piece of software. The signed software may include the original software, the signature and with a digital signature algorithm, and may further include some additional information, as appropriate. For example, padding or salt may be added.

At block 310, the software may be transmitted or otherwise made available for download by the requester. The software may then be downloaded by the requester.

Figure 4:
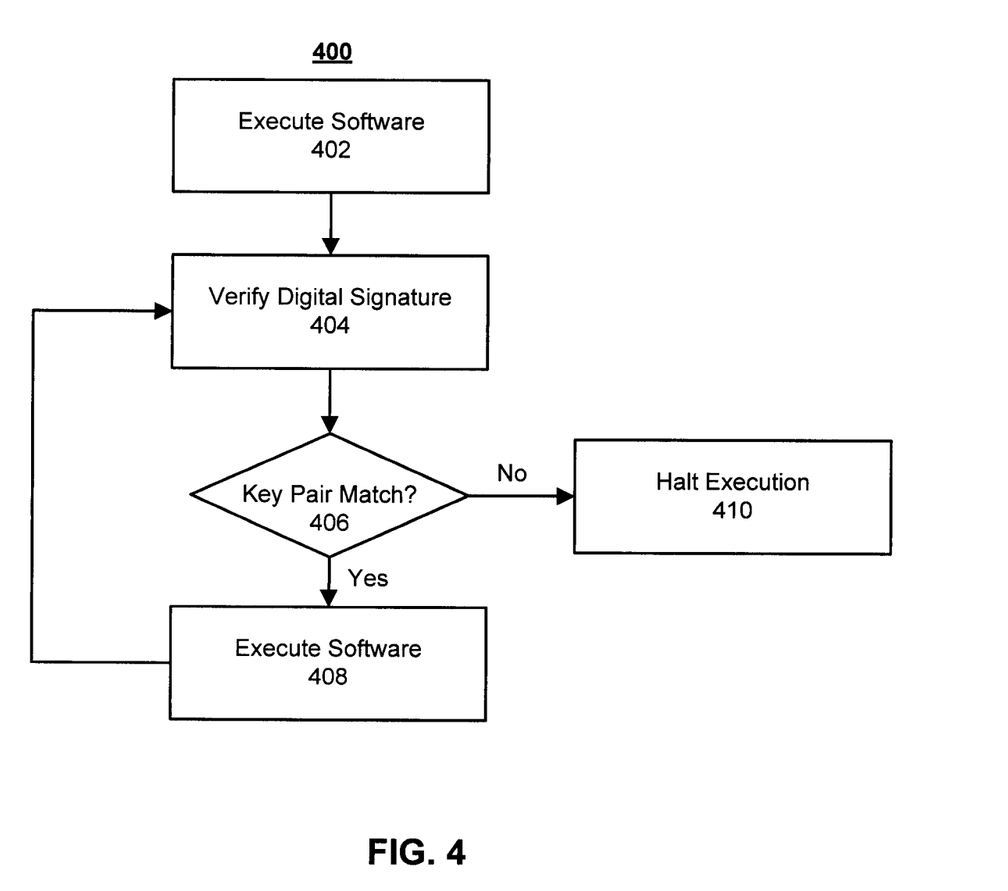
FIG. 4 is a flow chart of a method for executing signed code in accordance with an exemplary embodiment.

FIG. 4 depicts a flow chart of a method for using signed code according to exemplary embodiments. Exemplary method 400 is provided by way of example, as there are a variety of ways to carry out the methods disclosed herein. The method 400 as shown in FIG. 4 may be executed or otherwise performed by one or a combination of various systems, such as a computer implemented system.

At block 402, the software is executed. The software may be the downloaded software from the method 300. The software may be digitally signed as described above. The software may be downloaded and stored by the requester. The software may be downloaded using the individual device and/or stored on the individual device. In various embodiments, the software may be downloaded using another device and/or stored apart from the individual device.

At block 404, the digital signature may be verified. The verification may ensure that the digital signature is valid. The verification may occur as part of execution of the software. According to one exemplary embodiment, the verification algorithm may be: Verify(signed_message, public_key)→accept/reject. Other verification algorithms may be used. Thus, the verification algorithm may access the signed software and the public key and determine if the signature is valid.

It should be appreciated that the instructions that a CPU executes are typically built by a series of other programs, called compilers that translate human readable text into the binary instruction stream executed by the CPU. In order for the verifier in the (modified) CPU to accept the code according to exemplary embodiments, the code must be signed by the manufacturer for each individual device using the private key stored in the secret database.

Because the verifier may operate at the granularity of a cache line, the compiled instructions may be broken into cache lines. Each cache line may be signed using the chosen digital signature algorithm using the private key corresponding to the public key for the individual device, as described above. This can make the executable code larger because, for example, signed messages are typically larger than the original messages. Expanding the executable code requires remapping offsets stored in the executable code, as should be appreciated.

As described above, the CPU may contain a functional block called a verifier. The verifier may operate such that each cache line received from main memory is digitally signed. The verification algorithm may be executed on the cache line using the public key embedded in the CPU.

At block 406, if the key pair matches (that is, the signature is valid), the method proceeds to block 408 and the software (such as the line of code) is executed. For example, the CPU may proceed to store the instructions in the signed message into the instruction cache for normal execution.

If the key pair does not match (that is, the signature is not valid), the execution of the software is halted at block 410. A warning or other indication may be presented to the user of the lack of matching between the key pair.

The method 400 may repeat as indicated in FIG. 4. The method may repeat for a various intervals during the execution of the software based on what level the software is digitally signed. For example, each step executed by the software may be verified. In various embodiments, a lesser interval of execution may be checked during execution. For example, after every 5 or 10 lines of code, verification may be conducted. If at any point, the digital signature is not verified properly, the execution may be halted.

Exemplary embodiments may prevent reuse of valid cache lines. Preventing reuse of valid cache lines may prevent a hacker from attempting to circumvent the methods described above. Exemplary embodiments may assume a 64 bit virtual address space on the CPU. This is equivalent to 16 million terabytes. It should be appreciated that other lengths of virtual address space may be used. As part of the encoding process, the manufacturer may assign each unique program a unique range of addresses within this significant space. Additionally, the assigned address space can and should be different for each individual device that is encoded for. The address of the cache line may be included as part of the message that is signed. The signed message may also contain the cache line address. However, in some embodiments, this may be deleted to save memory. The verifier knows the address of the cache line because that is where it is fetched from. Prior to verifying the signature, the verifier may add the actual fetch address back into the signed message. Thus no cache line may be reused at any other address. This prevents the reuse and reordering of cache lines.

It will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, combinations of the present embodiments, and uses and advantages of the present invention will be apparent to those skilled in the art from consideration of the specification and practice of the invention disclosed herein. The specification and examples should be considered exemplary.

What is claimed is:

1. A computer implemented method, comprising:
   generating a unique key pair, comprising a public key and a private key, for an individual device;

embedding the public key into a central processing unit (CPU) of the individual device such the public key is not alterable;

assigning, by a manufacturer, a unique range of addresses, from a virtual address space on the CPU, to a downloaded software code;

breaking a set of compiled instructions corresponding to the downloaded software code into a plurality of cache lines, wherein each cache line is digitally signed using the private key and is associated with a cache line address from the unique range of addresses;

programming logic into the central processing unit preventing execution of one or more unauthorized cache lines, wherein an unauthorized cache line corresponds to a cache line that is not digitally signed with the private key and does not correspond to the associated cache line address; and storing the private key in a data store that is separate from the individual device.

2. The method of claim 1, wherein the virtual address space corresponds to a 64 bit virtual address space.

3. The method of claim 1, wherein the logic is programmed into an instruction cache of the central processing unit and the logic comprises a functional block between a main memory and the instruction cache of the central processing unit that ensures each instruction is digitally signed with the private key prior to entering the instruction cache for execution by the central processing unit.

4. The method of claim 3, wherein the functional block prevents execution of an instruction that lacks a valid digital signature.

5. The method of claim 1, wherein the individual device is a gaming console or a portable gaming device.

6. A computer implemented method, comprising:
receiving a request for software code over a computer network;

identifying an individual device associated with the request by correlating the device with a central processing unit having a public key embedded therein;

identifying a private key corresponding to the public key associated with the individual device wherein the public key and private key form a uniquely generated key pair;

retrieving the private key;

digitally signing the software code with the private key;

assigning, to the software code a unique address space; and providing the digitally signed software code with the unique address space for download, wherein the unique address space is selected from a virtual address space on the central processing unit and is assigned by a manufacturer and wherein the central processing unit has logic programmed into an instruction cache of the central processing unit and the logic comprises a functional block between a main memory and the instruction cache of the central processing unit that ensures each instruction is digitally signed with the private key and corresponds to the unique address space prior to entering an instruction cache for execution by the central processing unit.

7. The method of claim 6, wherein the functional block prevents execution of an instruction that lacks a valid digital signature.

8. The method of claim 6, wherein the individual device is a gaming console or a portable gaming device.

9. A system, comprising:
a processor comprising a public key permanently embedded thereon, wherein a private key corresponding to the public key is stored separately and externally to the system; and a cache comprising computer-readable instructions comprising logic that comprises a functional block between a main memory and the cache that ensures each instruction is digitally signed with the private key and corresponds to an assigned address included with each instruction prior to entering the instruction cache for execution by the processor, wherein the assigned address is assigned by a manufacturer from a virtual address space on the processor, to a downloaded software code.

10. The system of claim 9, wherein the processor is part of a gaming console or a portable gaming device.

11. The system of claim 9, wherein the functional block prevents execution of an instruction that lacks a valid digital signature.

12. The method of claim 7, wherein the functional block further prevents execution of an instruction that does not correspond to the unique address space.

* * * * *